(12) United States Patent
Dry (10) Patent No.: US 9,937,826 B2
(45) Date of Patent: *Apr. 10, 2018

(54) BLADDER SYSTEM FOR VEHICLE SEATING ASSEMBLY

(71) Applicant: Ford Global Technologies, LLC, Dearborn, MI (US)

(72) Inventor: Alan George Dry, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

This patent is subject to a terminal disclaimer.

(21) Appl. No.: 14/844,679

(22) Filed: Sep. 3, 2015

(65) Prior Publication Data

US 2017/0066350 A1    Mar. 9, 2017

(51) Int. Cl.
*B60N 2/64*    (2006.01)
*B60N 2/66*    (2006.01)
*B60N 2/44*    (2006.01)
*B60N 2/20*    (2006.01)

(52) U.S. Cl.
CPC ............. *B60N 2/4415* (2013.01); *B60N 2/64* (2013.01); *B60N 2/206* (2013.01); *B60N 2/66* (2013.01)

(58) Field of Classification Search
CPC ...... B60N 2/4415; B60N 2/64; B60N 2/7082; B60N 2/7088; B60N 2/7035; B60N 2/206; B60N 2/66; B60N 2/665
See application file for complete search history.

(56) References Cited

U.S. PATENT DOCUMENTS

| 2,077,233 | A | * | 4/1937 | Greenhill | B60N 2/7082 267/117 |
| 2,664,241 | A | * | 12/1953 | Sunday | A01K 97/00 114/183 R |
| 2,672,183 | A | * | 3/1954 | Forsyth | B60N 2/7082 297/452.48 |
| 2,804,911 | A | * | 9/1957 | Howarth | A47C 27/081 267/117 |
| 3,326,601 | A | * | 6/1967 | Parkinson | A47C 4/54 297/1 |
| 3,330,598 | A | * | 7/1967 | Whiteside | A47C 4/54 297/284.3 |
| 3,730,588 | A | | 5/1973 | Braun | |
| 4,018,477 | A | | 4/1977 | Hogan | |
| 4,316,631 | A | | 2/1982 | Lenz et al. | |
| 4,536,030 | A | | 8/1985 | Sakurada et al. | |
| 4,555,140 | A | * | 11/1985 | Nemoto | B60N 2/4415 297/284.11 |

(Continued)

FOREIGN PATENT DOCUMENTS

DE        10158876 A1    6/2003
DE     102004017212 B3    6/2005

*Primary Examiner* — Phi A
(74) *Attorney, Agent, or Firm* — Vichit Chea; Price Heneveld LLP (57) ABSTRACT

A vehicle seating assembly includes a seat. A seat bladder is disposed between a support and trim material face. The bladder is positively pressurized when the seat is unoccupied. An elastomeric reservoir is operably coupled with the seat bladder via a fluid line, wherein fluid moves to and pressurizes the reservoir when a passenger is seated on the seat. A rigid containment unit is configured to house the reservoir and limit expansion of the reservoir.

20 Claims, 6 Drawing Sheets

(56) References Cited

U.S. PATENT DOCUMENTS

| | | | |
|---|---|---|---|
| 4,615,563 A * | 10/1986 | Kobayashi | A47C 7/022 297/284.11 |
| 4,629,248 A | 12/1986 | Mawbey | |
| 4,722,550 A * | 2/1988 | Imaoka | A47C 7/022 180/268 |
| 4,792,186 A | 12/1988 | Benjamin et al. | |
| 4,909,568 A | 3/1990 | Dal Monte | |
| 4,965,899 A | 10/1990 | Sekido et al. | |
| 5,137,333 A * | 8/1992 | Chee | A47C 7/022 297/452.21 |
| 5,190,348 A * | 3/1993 | Colasanti | A47C 7/467 297/284.6 |
| 5,369,828 A * | 12/1994 | Graebe | A47C 4/54 297/452.41 |
| 5,456,019 A | 10/1995 | Dowell et al. | |
| 5,461,741 A * | 10/1995 | Graebe | A47C 4/54 297/284.3 |
| 5,509,716 A | 4/1996 | Kolena et al. | |
| 5,529,377 A * | 6/1996 | Miller | A47C 4/54 297/284.6 |
| 5,584,085 A | 12/1996 | Banko | |
| 5,617,595 A * | 4/1997 | Landi | A61G 5/1043 297/452.41 |
| 5,737,845 A | 4/1998 | Marasus | |
| 5,829,081 A * | 11/1998 | Pearce | A47C 27/083 5/654 |
| 5,845,352 A * | 12/1998 | Matsler | A47C 7/021 297/452.41 |
| 5,879,053 A | 3/1999 | Lux et al. | |
| 5,967,608 A * | 10/1999 | Van Sickle | A47C 7/467 297/284.4 |
| 5,984,349 A * | 11/1999 | Van Voorhies | B60N 2/002 177/144 |
| 6,027,171 A * | 2/2000 | Partington | B60N 2/0232 297/284.1 |
| 6,036,265 A | 3/2000 | Cosentino | |
| 6,203,105 B1 * | 3/2001 | Rhodes, Jr. | A47C 4/54 297/284.1 |
| 6,234,578 B1 | 5/2001 | Barton et al. | |
| 6,353,207 B1 * | 3/2002 | Burt | A47C 4/54 219/217 |
| 6,370,716 B1 * | 4/2002 | Wilkinson | A61G 5/1043 297/314 |
| 6,386,633 B1 | 5/2002 | Newton | |
| 6,450,579 B1 | 9/2002 | Nylander et al. | |
| 6,554,360 B1 | 4/2003 | Wilke et al. | |
| 6,568,754 B1 | 5/2003 | Norton et al. | |
| 6,623,076 B2 | 9/2003 | Klingler et al. | |
| 6,865,825 B2 | 3/2005 | Bailey, Sr. et al. | |
| 6,901,617 B2 * | 6/2005 | Sprouse, II | A47C 4/54 297/219.1 |
| 6,905,170 B2 | 6/2005 | McMillen et al. | |
| 6,912,748 B2 | 7/2005 | VanSickle | |
| 7,059,678 B1 | 6/2006 | Taylor | |
| 7,086,700 B2 | 8/2006 | Habedank | |
| 7,108,323 B2 | 9/2006 | Welch et al. | |
| 7,225,486 B2 | 6/2007 | Jackson, III | |
| 7,255,399 B2 | 8/2007 | White et al. | |
| 7,311,358 B2 | 12/2007 | White et al. | |
| 7,490,900 B2 | 2/2009 | Szczudrawa | |
| 7,874,618 B2 | 1/2011 | Kohl et al. | |
| 8,540,318 B2 * | 9/2013 | Folkert | B60N 2/686 297/452.14 |
| 8,944,504 B2 | 2/2015 | Zimmerman, II | |
| 9,102,252 B2 * | 8/2015 | Sugiyama | B60N 2/22 |
| 9,211,824 B2 | 12/2015 | Arant et al. | |
| 9,550,439 B2 | 1/2017 | Dry | |
| 2006/0061183 A1 | 3/2006 | White et al. | |
| 2008/0122274 A1 | 5/2008 | Edwards | |
| 2010/0207443 A1 * | 8/2010 | Brncick | B60N 2/4415 297/452.48 |
| 2013/0285426 A1 | 10/2013 | Arant et al. | |
| 2015/0008710 A1 | 1/2015 | Young et al. | |
| 2015/0126926 A1 | 5/2015 | Giambattista et al. | |

\* cited by examiner

BLADDER SYSTEM FOR VEHICLE SEATING ASSEMBLY

FIELD OF THE DISCLOSURE

The present disclosure generally relates to a vehicle seating assembly, and more particularly to a seat bladder for a vehicle seat that provides seat comfort and assists in maintaining an occupant's H-point aligned with an H-point position designed in the vehicle seat.

BACKGROUND OF THE DISCLOSURE

The importance of providing a comfortable seating interface inside a vehicle has increased as drivers and passengers spend more time commuting in vehicles. The seating assemblies of these vehicles should also be durable and aesthetically pleasing.

SUMMARY OF THE DISCLOSURE

According to one aspect of the present disclosure, a vehicle seating assembly includes a vehicle seating assembly having a seat. A seat bladder is disposed between a support and trim material face. The bladder is positively pressurized when the seat is unoccupied. An elastomeric reservoir is operably coupled with the seat bladder via a fluid line, wherein fluid moves to and pressurizes the reservoir when a passenger is seated on the seat. A rigid containment unit is configured to house the reservoir and limit expansion of the reservoir.

According to another aspect of the present disclosure, a vehicle seating assembly includes a seat. A seat bladder is disposed between a support and trim material face. The bladder is positively pressurized when the seat is unoccupied. A reservoir bladder is operably coupled with the seat bladder via a fluid line. The reservoir bladder is pressurized when a passenger is seated on the seat.

According to yet another aspect of the present disclosure, a vehicle seating assembly includes a method of controlling a vehicle seating assembly. Shape retention baffles are positioned around a bladder disposed below a seating surface of a vehicle seat. The bladder is pressurized. After a predetermined time period following a passenger sitting on the vehicle seat, the bladder is depressurized, and an elastomeric reservoir is simultaneously pressured in fluid communication with the bladder. The bladder is repressurized after the passenger has left the vehicle seat.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
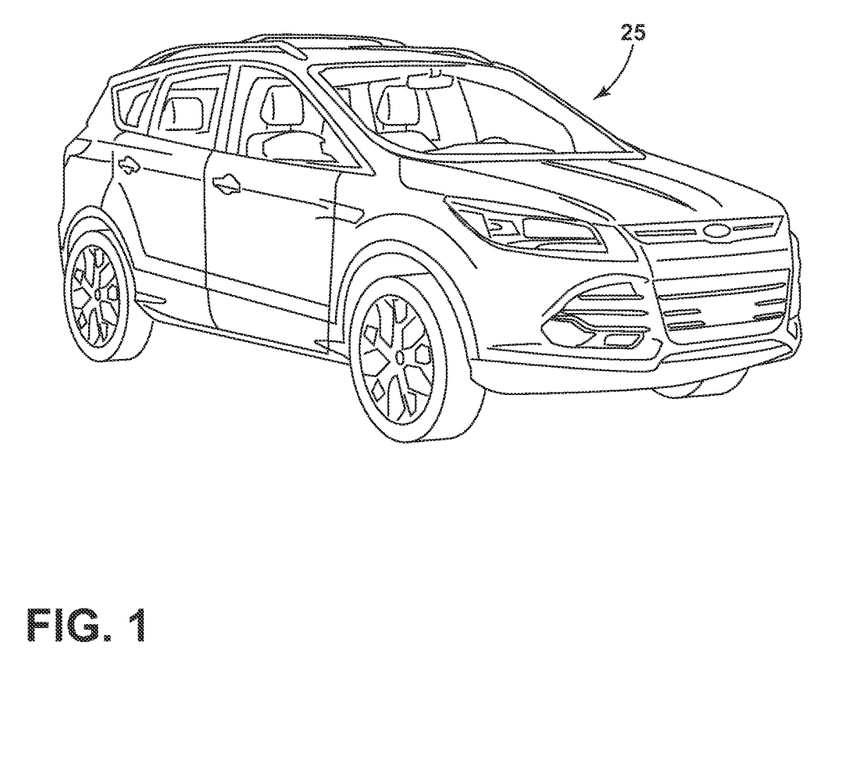
FIG. 1 is a front perspective view of a vehicle having an embodiment of a vehicle seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-5, reference numeral 10 generally designates a vehicle seating assembly having a seat 12. A seat bladder 14 is disposed between a support 16 and a trim material face 18. The seat bladder 14 is positively pressurized when the seat 12 is unoccupied. An elastomeric reservoir 20 is operably coupled with the seat bladder 14 via a fluid line 21, wherein a fluid 22 moves to and pressurizes the elastomeric reservoir 20 when a passenger is seated on the seat 12. A rigid containment unit 24 is configured to house the elastomeric reservoir 20 and limit expansion of the elastomeric reservoir 20.

With reference again to FIG. 1, the vehicle seating assembly 10 is generally configured for use inside a vehicle 25, such as a car, a truck, or a van. Although the vehicle seating assembly 10 is generally shown in a rear passenger seat of the vehicle 25, it will also be understood that the vehicle seating assembly 10 could be positioned in a forward passenger seat or a driver's seat of the vehicle 25. Regardless of the position of the vehicle seating assembly 10, the vehicle seating assembly 10 will be configured to accommodate the static and dynamic loads associated with transporting a passenger P.

Figure 2:
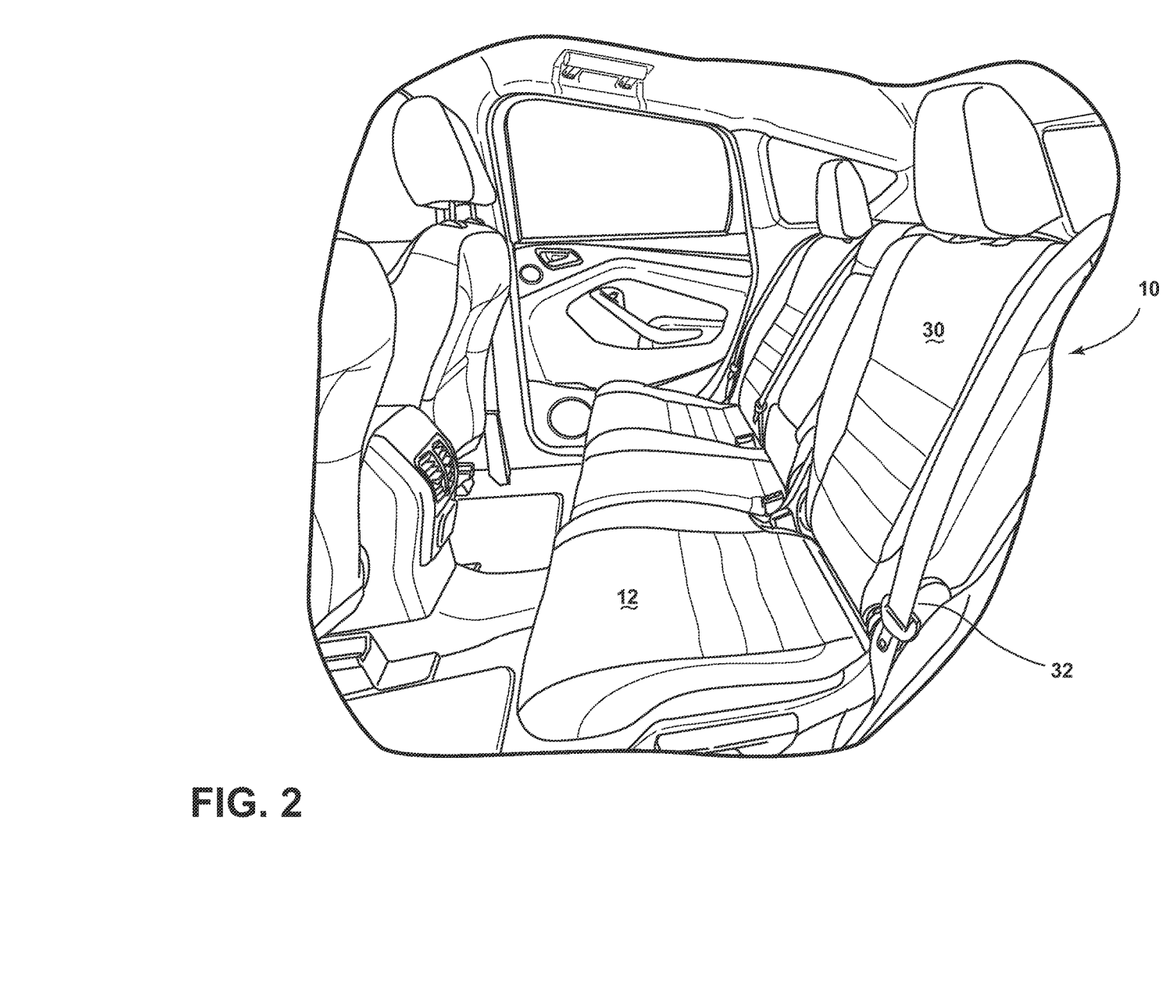
FIG. 2 is a side perspective view of a vehicle seating assembly of a back seat area of the present disclosure.

With reference to FIG. 2, the vehicle seating assembly 10 includes the seat 12, as well as a seatback 30. The seat 12 and the seatback 30 are pivotally coupled together to provide an adjustable arrangement, resulting in comfort provided to the driver or passenger. The seat 12 and the seatback 30 are supported on a frame 32 configured to provide support to the seat 12 and the seatback 30, and at the same time be able to withstand the forces associated with dynamic and static loading applied by the weight of the passenger P.

Figure 3:
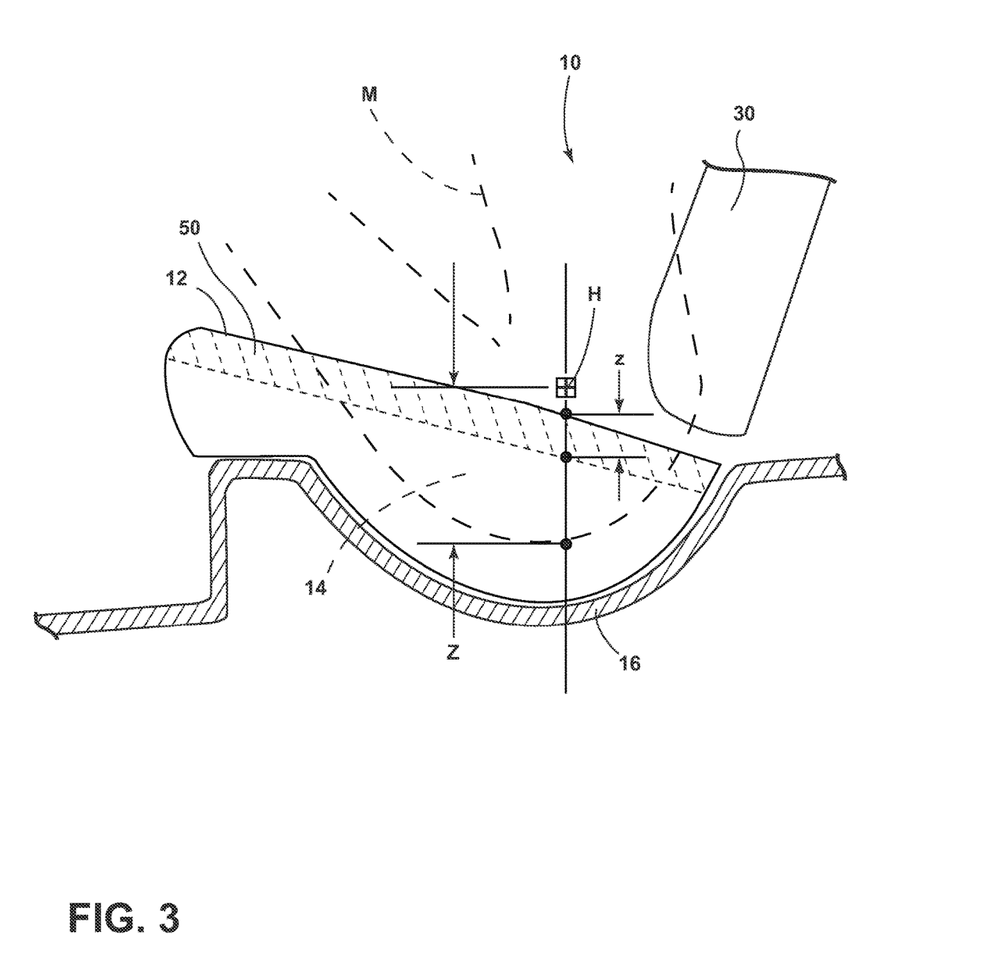
FIG. 3 is a side elevational view of a vehicle seating assembly of the present disclosure before a passenger sits on the vehicle seating assembly.

With reference now to FIG. 3, the seat 12 generally includes the seat bladder 14, which is operable between an inflated or pressurized condition and a deflated or depressurized condition. The seat bladder 14 is configured to provide an aesthetically pleasing vehicle seating assembly 10, and at the same time, allow the hip point of the passenger P to be set at an ideal location for purposes of safety during a collision event.

When designing vehicle seating assemblies, design parameters require that the H-point of a mannequin be aligned with the specified H-point for that particular vehicle seat in the vehicle. Meeting the H-point is a legal and practical requirement which directly affects the occupant's crash restraint during a collision event. The H-point positions the head at the appropriate position relative to the head restraint on the vehicle seating assembly and to the vehicle's roof. Accordingly, the importance of the H-point cannot be understated in insuring that the vehicle seating assembly 10 is safe for passengers. At the same time, the appearance of the seat cushions, and particularly the upper surface of the seat cushions, is determined by styling studio preferences related to the aesthetics of the vehicle 25. In addition, seating comfort calls for specific load deflection characteristics be built into the seat surface. Stated differently, too hard of a seat would be uncomfortable and too soft of a seat would also be uncomfortable to a typical passenger. Accordingly, the three aforementioned input requirements (positioning mannequin's H-point at the proper position during collision, providing an aesthetically pleasing support surface to the vehicle seating assembly 10, and constructing a seat 12 that has the appropriate load-deflection characteristics to provide a comfortable ride to passengers) must be resolved.

With reference to FIG. 3, the H-point of a mannequin M is placed onto the seating surface such that the H-point of the mannequin M is aligned with that of the vehicle seating assembly. By default, the vertical distance between the seated mannequin's lower surface and the studio seat trim surface is defined by an uppercase "Z" as shown in FIG. 3. However, the penetration distance allowed for seat comfort below the seat trim surface is shown as a lowercase "z." The large and frequently difficult to reconcile difference between Z and z is resolved in this disclosure. If the studio surface is applied and the seating surface is depressed to satisfy the mannequin's H-point, the seating surface will be compressed to the full Z value and will not provide firm support to a passenger. If the studio surface is used in the comfort indentation and z is satisfied, then the mannequin will not penetrate into the seat 12 to the H-point of the seat 12 and will not meet legal and practical requirements of the vehicle seating assembly 10. Alternatively, if the studio seating surface is lowered or the H-point of the mannequin is aligned with the H-point of the vehicle seating assembly 10, the seating appearance will be negatively impacted.

The vehicle seating assembly 10 of the present disclosure allows a studio surface to be maintained and therefore aesthetically pleasing, the comfort deflection z is maintained as well as the full Z deflection to the H-point. This is accomplished by utilizing a bladder 14 in combination with the elastic reservoir 20 as set forth in further detail herein.

Figure 4:
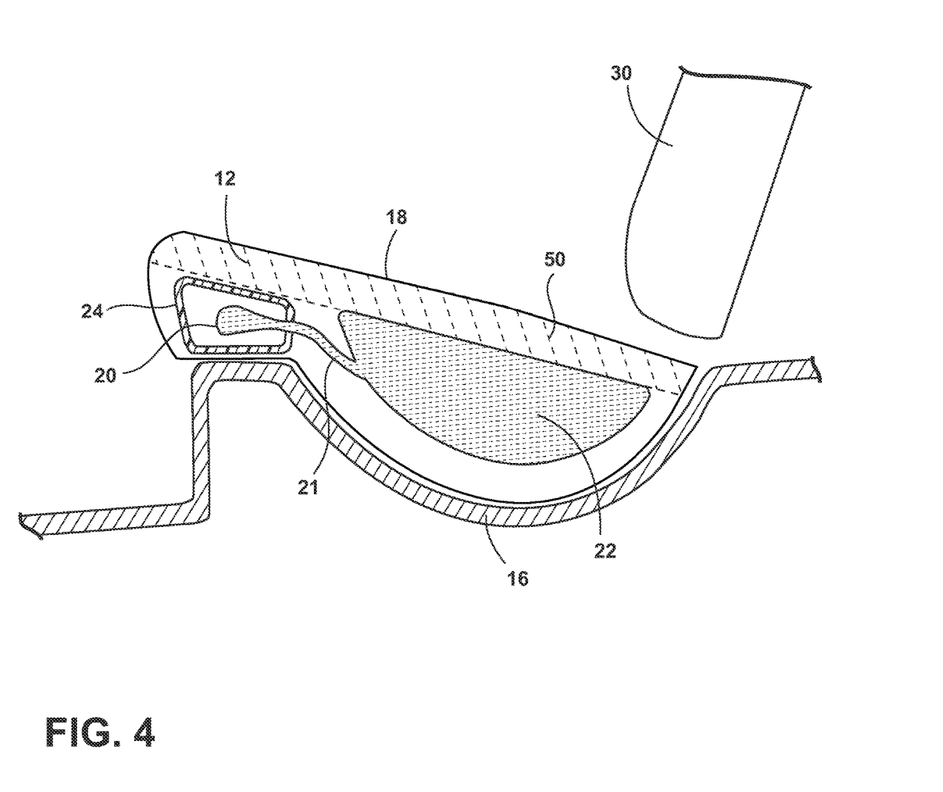
FIG. 4 is a side elevational partial cross-sectional view of the vehicle seating assembly of FIG. 3.

With reference to FIG. 4, during normal use, in the vehicle seating assembly 10, the bladder 14 is positioned from a middle to rear portion of the seat 12. The reservoir 20 is positioned forward of the seat bladder 14 and housed inside the rigid containment unit 24. In normal use, the elastomeric reservoir 20 applies pressure to the fluid contents shared between the seat bladder 14 and the elastomeric reservoir 20. Accordingly, the elastomeric reservoir 20 forces the air into the seat bladder 14 such that the seat bladder 14 is generally full and applies pressure to a thin foam layer 50 above the bladder 14. Consequently, the seating surface 18 is forced upward such that the vehicle seating assembly 10 and the vehicle seating surface include a full aesthetically pleasing appearance. As previously noted, this condition is generally illustrated in FIG. 4.

Figure 4A:
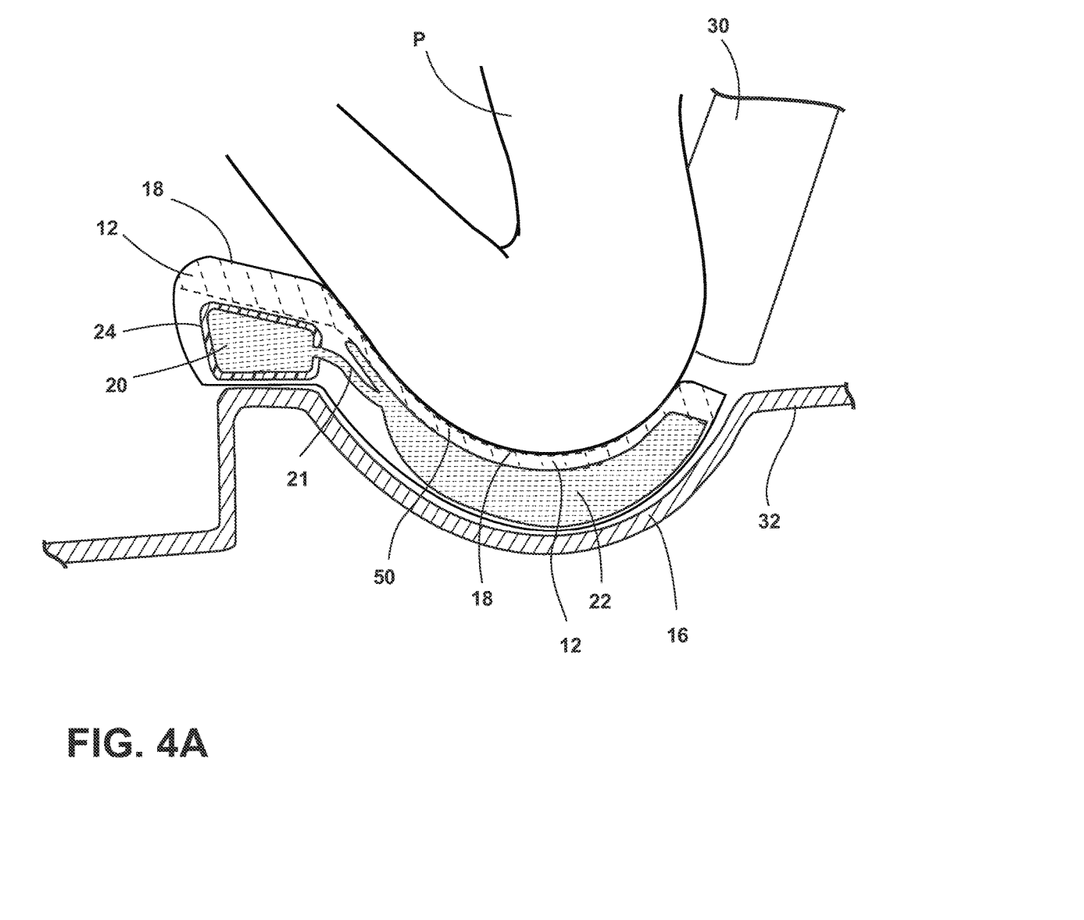
FIG. 4A is a side elevational partial cross-sectional view of a vehicle seating assembly of the present disclosure with a passenger seated on the vehicle seating assembly.

With reference now to FIG. 4A, upon application of weight applied by a user after sitting on the vehicle seating assembly 10, the fluid 22 located in the bladder 14 is expelled into the elastomeric reservoir 20 which is disposed again in the rigid containment unit 24. Consequently, the overall volume of the bladder 14 is lessened. As a result, the occupant's H-point is aligned with the H-point set for the vehicle seating assembly 10.

Figure 5:
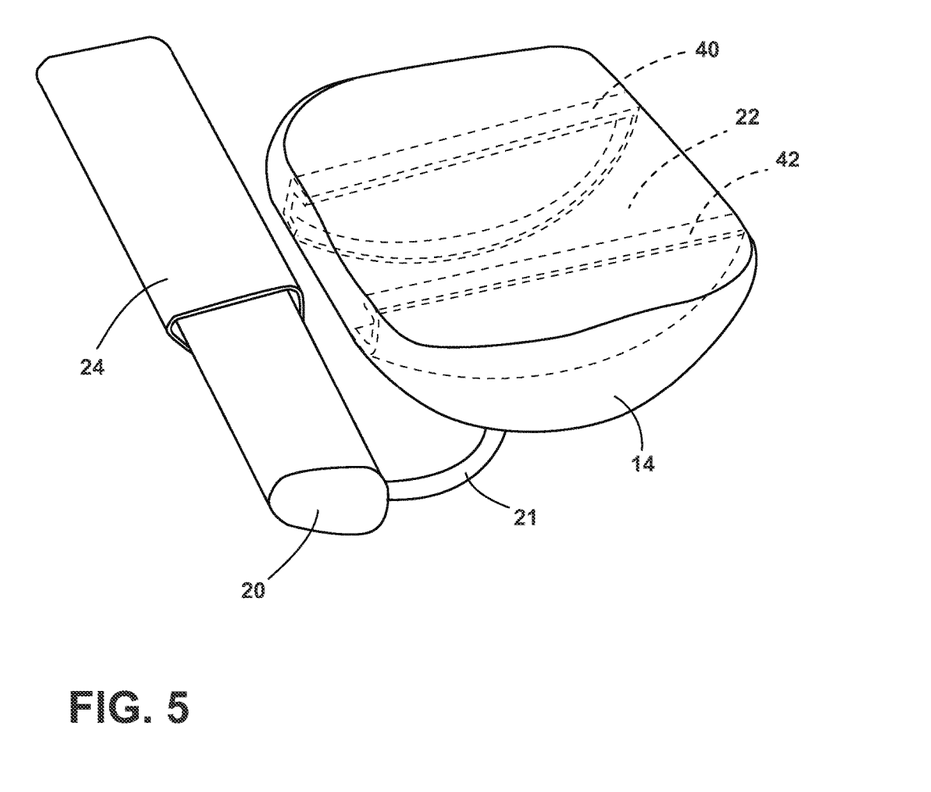
FIG. 5 is a top perspective view of an embodiment of a bladder and reservoir for a vehicle seating assembly of the present disclosure.

With reference to FIG. 5, the bladder 14 may include shaped retention baffles disposed therein. Any number of shaped retention baffles may be used. In the illustration of FIG. 5, a first retention baffle 40 and a second retention baffle 42 are used to help maintain the general configuration and shape of the bladder 14 after multiple uses. The shape retention baffles may also be used to prevent full deflation of the seat bladder 14 when a passenger is seated on the seat 12.

An occupant will generally experience the vehicle seating assembly 10 in three stages. Initially, the occupant will approach the vehicle 25 and see the full desired studio seating cushion surface. As the occupant enters the vehicle 25 and sits in the vehicle 25, the occupant will experience firm support provided by the z comfort deflection distance. However, the occupant will not, at this time, be at the correct restraint or head clearance position. Within a few moments, likely less than a minute of being seated, the occupant will have moved downward to place the occupant in the legal and desired crash position. Stated differently, the designed H-point in the vehicle seating assembly 10 is now aligned with the H-point of the occupant. When the seat 12 is unoccupied, the elastomeric reservoir 20 is nearly empty and the seat bladder 14 is both full and pressurized to insure that the seating surface is aesthetically pleasing and meets studio requirements. At the same time, the seating surface provides a firm support when the occupant places weight on the vehicle seating assembly 10. As the occupant sits on the seating surface, the bladder 14 begins to compress and provide comfort and minor deflection in the seat 12. The deflection occurs as the seat bladder 14 continues to gradually exhaust air from the seat bladder 14 to the elastomeric reservoir 20. After a period of time, likely less than a minute, the cushion bladder 14 will be exhausted to the H-point and the H-point of the seat 12 are aligned. When the occupant vacates the seat, the elastomeric reservoir 20 will once again fill the seat bladder 14 to achieve the studio profile. The rate of the cushion bladder inflation is much higher than the deflation rate. Although the elastomeric reservoir 20 is illustrated as being in a front portion of the vehicle seating assembly 10, the elastomeric reservoir 20 could be located in any number of positions within or outside the seat 12.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
   a seat;
   a seat bladder disposed between a support and a seating surface, the bladder being positively pressurized when the seat is unoccupied;
   an elastomeric reservoir operably coupled with the seat bladder via a fluid line, wherein fluid moves from the seat bladder to pressurize the reservoir when a passenger sits on the seat; and
   a rigid containment unit configured to house the reservoir and limit expansion of the reservoir.

2. The vehicle seating assembly of claim 1, further comprising:
   a plurality of shape retention baffles disposed around the seat bladder.

3. The vehicle seating assembly of claim 2, wherein the plurality of shape retention baffles prevent full deflation of the seat bladder when a passenger is seated on the seat.

4. The vehicle seating assembly of claim 1, wherein the elastomeric reservoir is disposed under a forward portion of the seat.

5. The vehicle seating assembly of claim 1, wherein the seat bladder exhausts fluid via the fluid line into the elastomeric reservoir when a passenger is seated on the seat.

6. The vehicle seating assembly of claim 5, wherein the seat bladder deflates a predetermined volume of fluid to position a hip point of a passenger at an ideal collision height relative to the seat.

7. The vehicle seating assembly of claim 1, wherein the seat bladder, when fully pressurized applies an upward force to a coverstock of the seat.

8. A vehicle seating assembly comprising:
   a seat;
   a seat bladder disposed between a support and seating surface, wherein the bladder is positively pressurized when the seat is unoccupied; and
   a reservoir bladder disposed within a forward rigid containment unit operably coupled with the seat bladder via a fluid line, wherein the reservoir bladder is pressurized against the rigid containment unit when a passenger is seated on the seat.

9. The vehicle seating assembly of claim 8, further comprising:
   a plurality of shape retention baffles disposed around the seat bladder.

10. The vehicle seating assembly of claim 9, wherein the plurality of shape retention baffles prevent full deflation of the seat bladder when a passenger is seated on the seat.

11. The vehicle seating assembly of claim 8, wherein the reservoir bladder is disposed under a forward portion of the seat.

12. The vehicle seating assembly of claim 8, wherein the seat bladder exhausts fluid via the fluid line into the reservoir bladder when a passenger is seated on the seat.

13. The vehicle seating assembly of claim 12, further comprising:
   a rigid containment unit configured to house the reservoir bladder and limit expansion of the reservoir bladder.

14. The vehicle seating assembly of claim 12, wherein the seat bladder deflates a predetermined volume of fluid to position a hip point of a passenger at an ideal collision height relative to the seat.

15. The vehicle seating assembly of claim 8, wherein the seat bladder, when fully pressurized applies an upward force to a coverstock of the seat.

16. A method of controlling a vehicle seating assembly comprising:
   positioning shape retention baffles around a bladder disposed below a seating surface of a vehicle seat;
   pressurizing the bladder with fluid from elastomeric reservoir;
   after a predetermined time period following a passenger sitting on the vehicle seat, depressurizing the bladder and simultaneously pressuring the elastomeric reservoir in fluid communication with the bladder; and
   repressurizing the bladder after the passenger has left the vehicle seat.

17. The method of claim 16, further comprising:
   positioning two baffles in the bladder that generally divide an internal volume of the bladder into thirds.

18. The method of claim 16, further comprising:
positioning the elastomeric reservoir into a rigid containment unit.

19. The method of claim 18, further comprising:
positioning the rigid containment unit under a front portion of the seat.

20. The method of claim 16, further comprising:
constructing the bladder, fluid line, and reservoir as a closed system free of external pumps and valves.

* * * * *